340-870.11 SR
XR 3,662,366

United States Patent [15] 3,662,366
Neuville et al. [45] May 9, 1972

[54] PROCESS FOR THE REMOTE READING OF MEMBERS FOR DETECTING VARIOUS VARIABLES, PARTICULARLY OF METERS AND SIMILAR, AND DEVICE FOR OPERATING THE SAME

[72] Inventors: Claude Marie Daniel Neuville, Creteil; Georges Emile Quenouille, Vanves; Andre Squarcioni, Sceaux; Jean-Joel Marcel Gustave Laurent, Paris, all of France

[73] Assignee: Compagnie Des Compteurs, Paris, France

[22] Filed: Oct. 2, 1969

[21] Appl. No.: 863,301

[30] Foreign Application Priority Data

Oct. 8, 1968 France ....................169071

[52] U.S. Cl. ....................340/183, 340/182, 340/177, 340/203, 340/151, 340/357

[51] Int. Cl. ....................G08c 15/06

[58] Field of Search ....................340/183, 204, 150, 151, 188, 340/180, 205, 347 PR, 271, 357; 346/14 MR

[56] References Cited

UNITED STATES PATENTS 2,067,098 1/1937 Rogers ....................340/180

FOREIGN PATENTS OR APPLICATIONS 738,800 6/1953 Great Britain ....................340/150
160,751 10/1957 Sweden ....................340/150

*Primary Examiner*—Thomas B. Habecker
*Assistant Examiner*—Robert J. Mooney
*Attorney*—Pierce, Scheffler & Parker

[57] ABSTRACT

The device for remote reading of successive data from a plurality of successive movable detecting members has measuring units with two distinguishable areas, a plurality of pickup elements for scanning said areas to produce a signal, transfer members connected to each pickup element, means for successively activating each transfer members in successive scanning cycles and a computer member connected to the pickup member for collating and analyzing the successive signals.

9 Claims, 15 Drawing Figures

PROCESS FOR THE REMOTE READING OF MEMBERS FOR DETECTING VARIOUS VARIABLES, PARTICULARLY OF METERS AND SIMILAR, AND DEVICE FOR OPERATING THE SAME

Various devices have already been proposed for enabling the remote reading of measuring members, such as water meters, gas and electricity or fluid meters, or else thermometers, manometers, etc. . . , whose data can be converted into pulses, particularly electric pulses which can then be transmitted by various means. In the technique, for effecting this transmission, it has been proposed to use existing telephone lines, or radio waves or else pilot wires.

In the known devices, it is always necessary considerably to modify the detectors of the measuring members which are designated in that which follows by the general word "-pickup." Actually, to make possible the collating and analyzing possible of data transmitted by various pickups, each of them must transmit an information, called "address" enabling the various data transmitted to be marked and distinguishable.

Moreover, in most cases where remote reading is of practical interest, up till now, it has been necessary to transmit a whole train of data for each pickup.

Actually, if, for instance, one considers the case of an electricity meter, it is necessary, to enable reading the various totalizating drums, and consequently, all the totalizating drums must be provided with coding members.

The state of facts recalled above has, up till now, considerably limited the developing of the technique of remote reading on account of the increased complexity afforded by the pickup. This complexity will immediately appear since for example in the case of electricity meters it is often necessary to take account of multiple tariffs, which are functions of the hours when electric power has been consumed, and also functions of users, being private or industrial.

Also, in certain cases, it has been proved to be very difficult to provide pickups with the necessary means for transmitting their data, for it often occurs that complex mechanisms operating electrically must not be used. This is the case of gas meters.

The present invention creates an extremely new and cheap process, which, by putting it into operation, ensures the remote reading of all the pickups and this by only making extremely simple modifications to conventional pickups. For transmitting the corresponding data, the invention makes use of means which are themselves very simple and which afford great safety in their use, which, to a great extent, eliminates risks of breakdowns. Furthermore, by putting the process of the invention into operation, it is always possible to detect defective working in transmission and to localize immediately the place where the fault has occurred.

The invention mainly relates to make a display of detecting members having units defining the variables belonging to each member, each of said units being made by two successive areas, said detecting members are placed in an arbitrary order, scanning is then made of a first detecting member, a transfer signal is caused in relation with this first detecting member, so that a second detecting member is, in its turn, scanned and that thus is performed successively scanning of said detecting members in series according to said arbitrary order by a step-by-step advance in detecting, data corresponding to that of the areas displayed by each detecting member, the data coming from said detecting members as well as from each transfer signal are then directed one after another in a common receiving track, the data thus received are recorded one after the other in the same order as that of the detecting members, scanning is repeated according to said arbitrary order at the end of a lapse of time less than the minimum time that may be taken by the most rapid detecting member for passing from one to the other of said two successive areas of each of the units, said scannings are renewed in a repetitive manner, then records of said data are collated for making up the number of passages from one area to another of each detecting member.

The invention also relates to a device for operating the afore-mentioned process.

Various other characteristics will moreover be revealed by the detailed description which follows.

Embodiments of the invention are shown by way of non-restrictive examples in the accompanying drawings.

Figure 2:
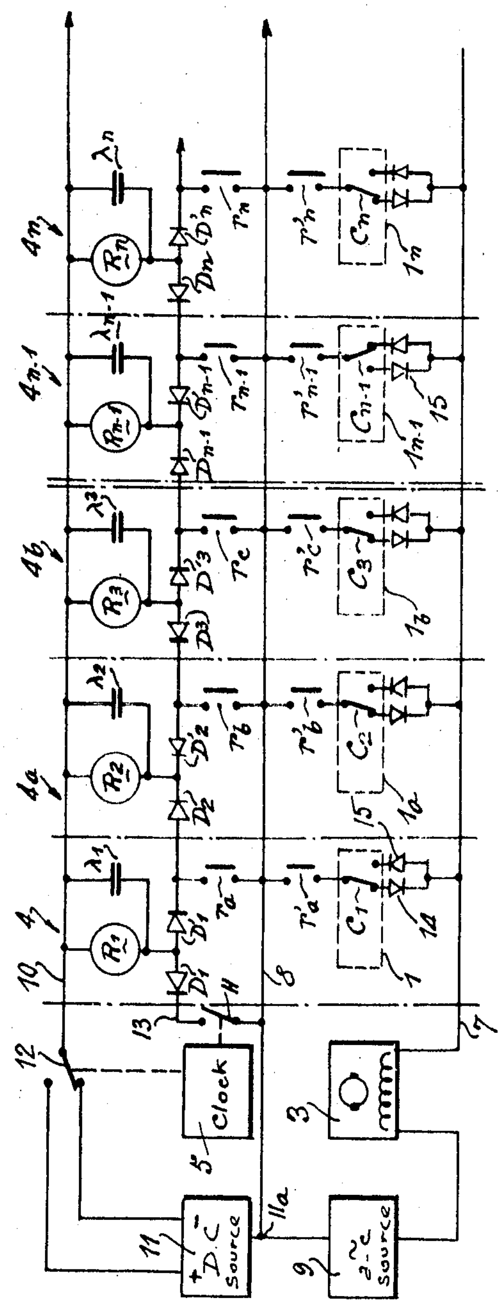
FIG. 2 is a diagram showing a first embodiment of a device for operating the invention.
Figure 3:
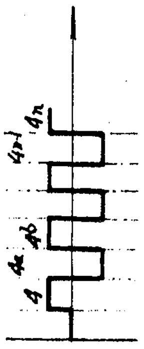
Figure 3A:
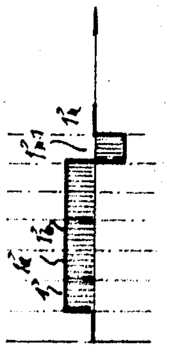
Figure 3B:
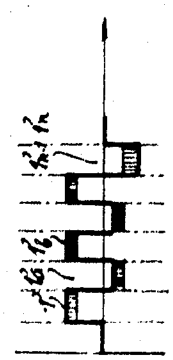

FIGS. 3, 3*a* and 3*b* are explanatory curves showing how the device of FIG. 2 works.

Figure 4:
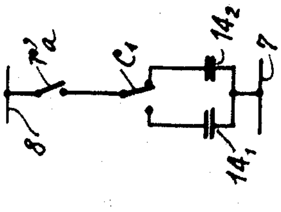
Figure 5:
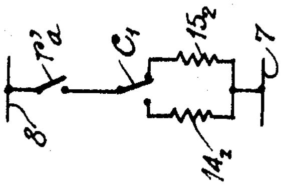
Figure 6:
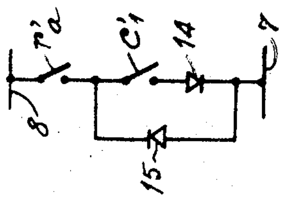

FIGS. 4 to 6 are partial diagrams of modifications of one of the parts of the device of FIG. 2.

Figure 7:
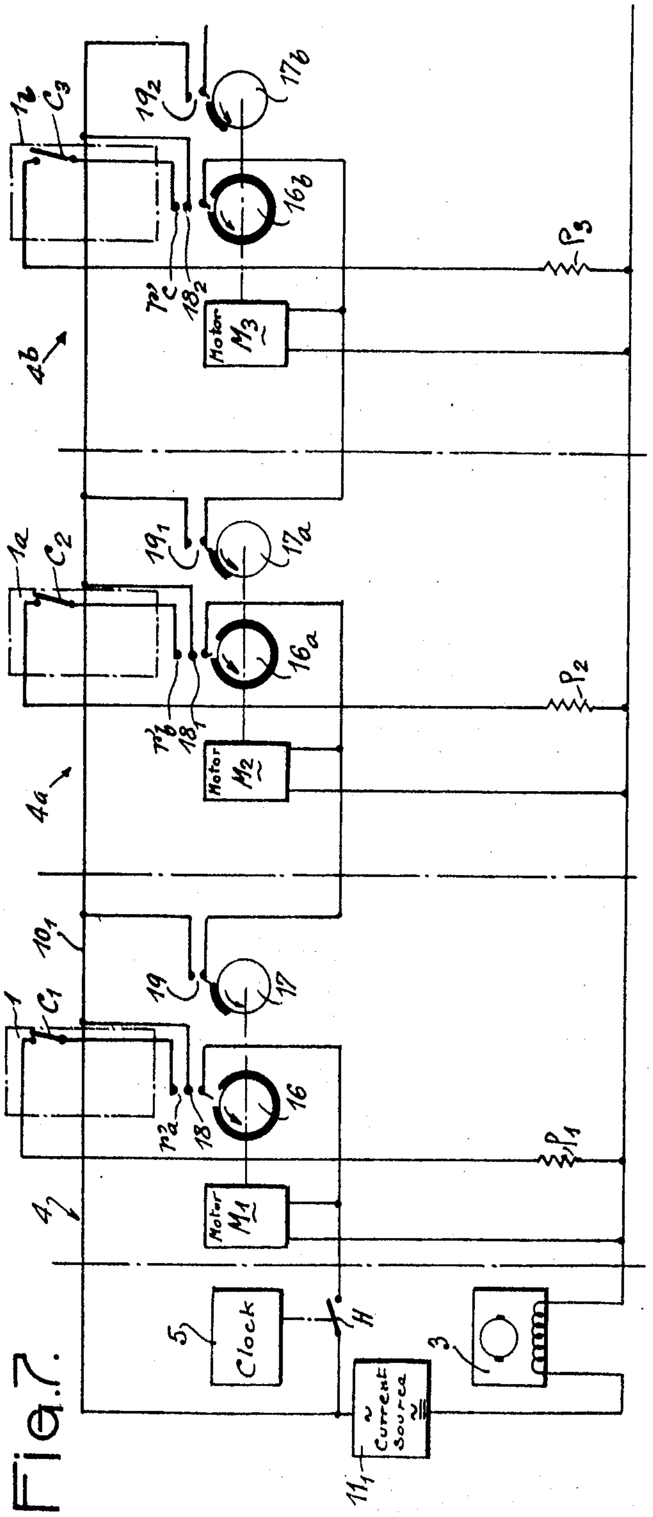

FIG. 7 is a diagram similar to FIG. 2, showing a first alternative embodiment.

Figure 8:
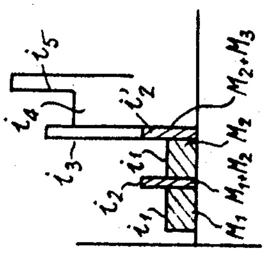

FIG. 8 is a curve showing the working of the device of FIG. 7.

Figure 9:
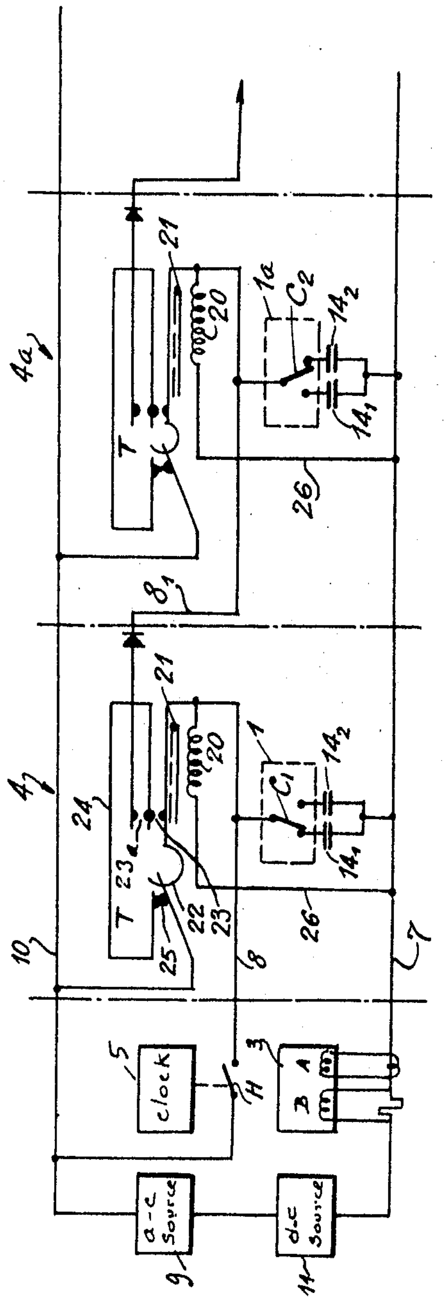

FIG. 9 is a diagram similar to FIGS. 2 and 7 of a second alternative embodiment.

Figure 10:
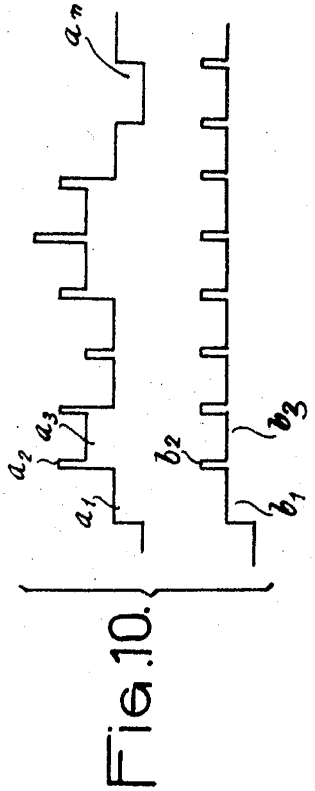

FIG. 10 is a curve showing the working of the alternative of FIG. 9.

Figure 11:
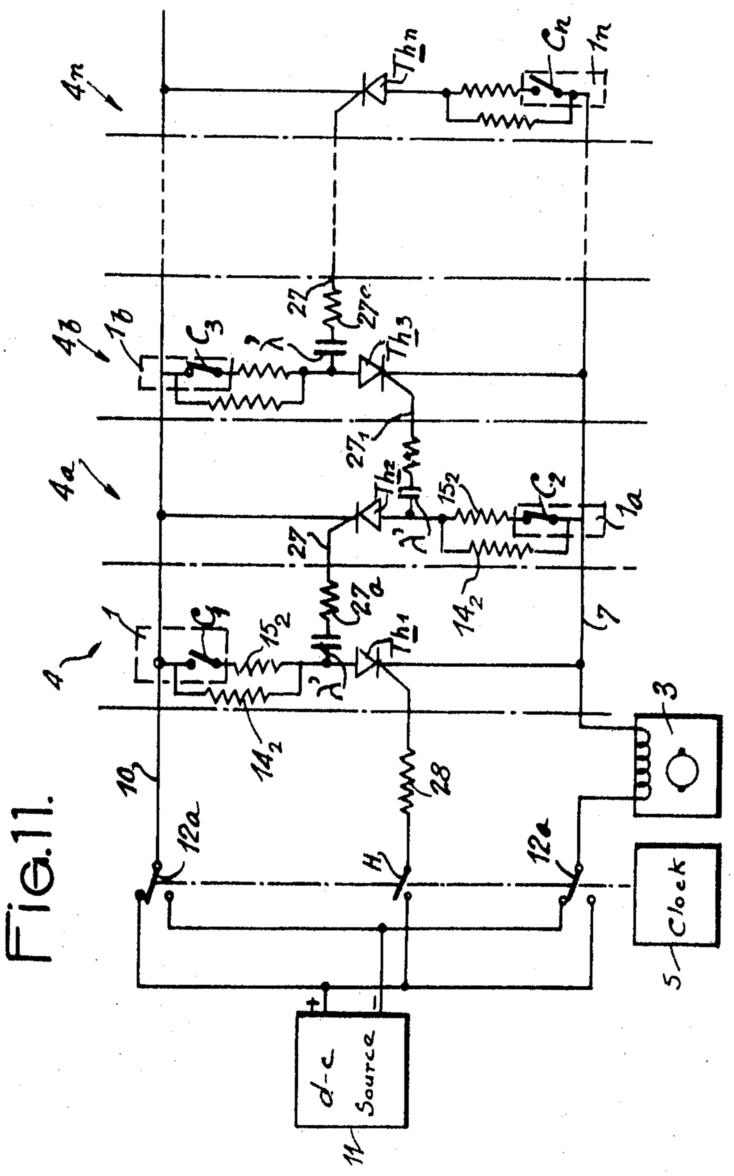

FIG. 11 is a diagram of a third alternative embodiment of the device of FIG. 2.

Figure 12:
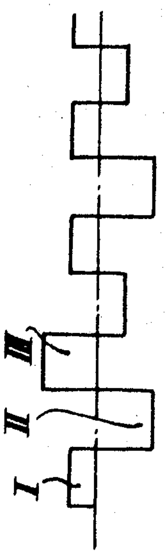

FIG. 12 is a curve showing the working according to the alternative of FIG. 11.

Figure 13:
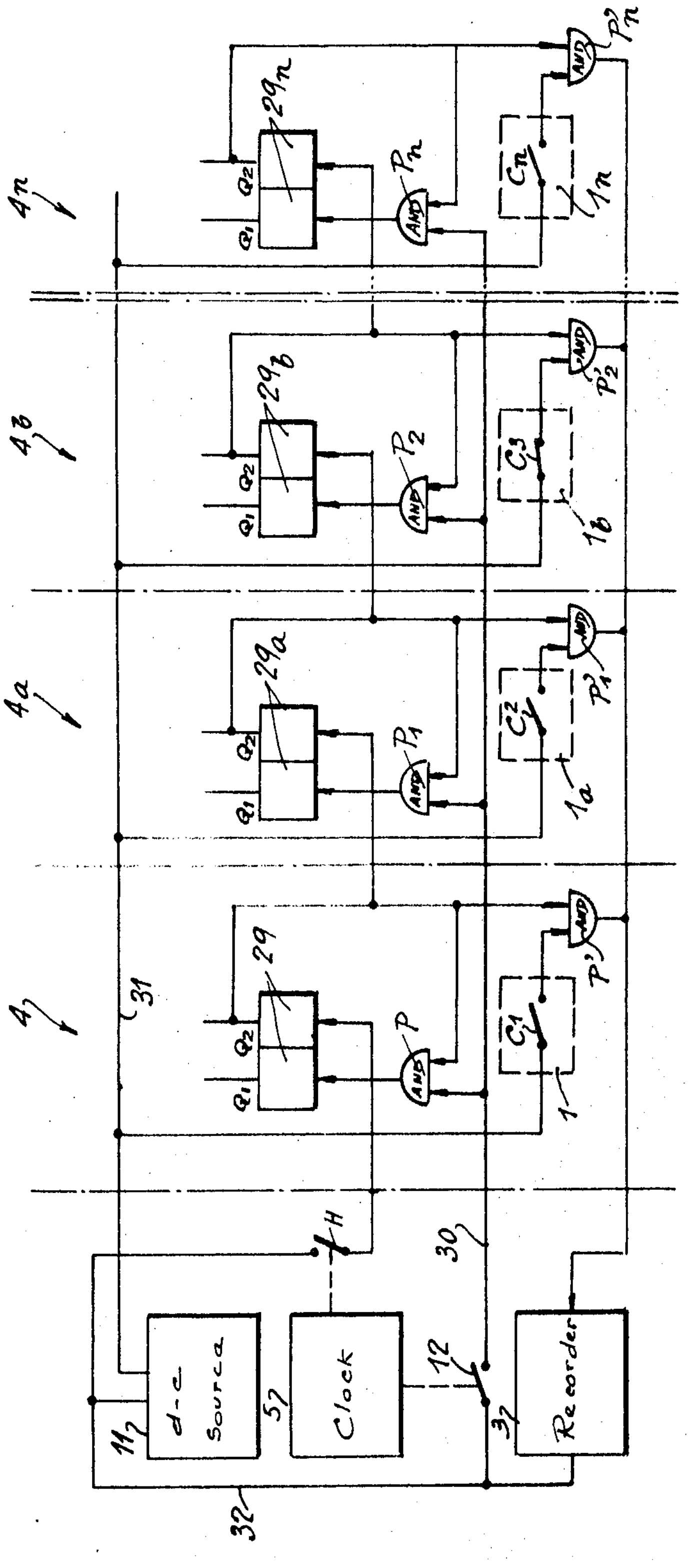

FIG. 13 is a diagram showing a fourth alternative embodiment of the device.

Figure 1:
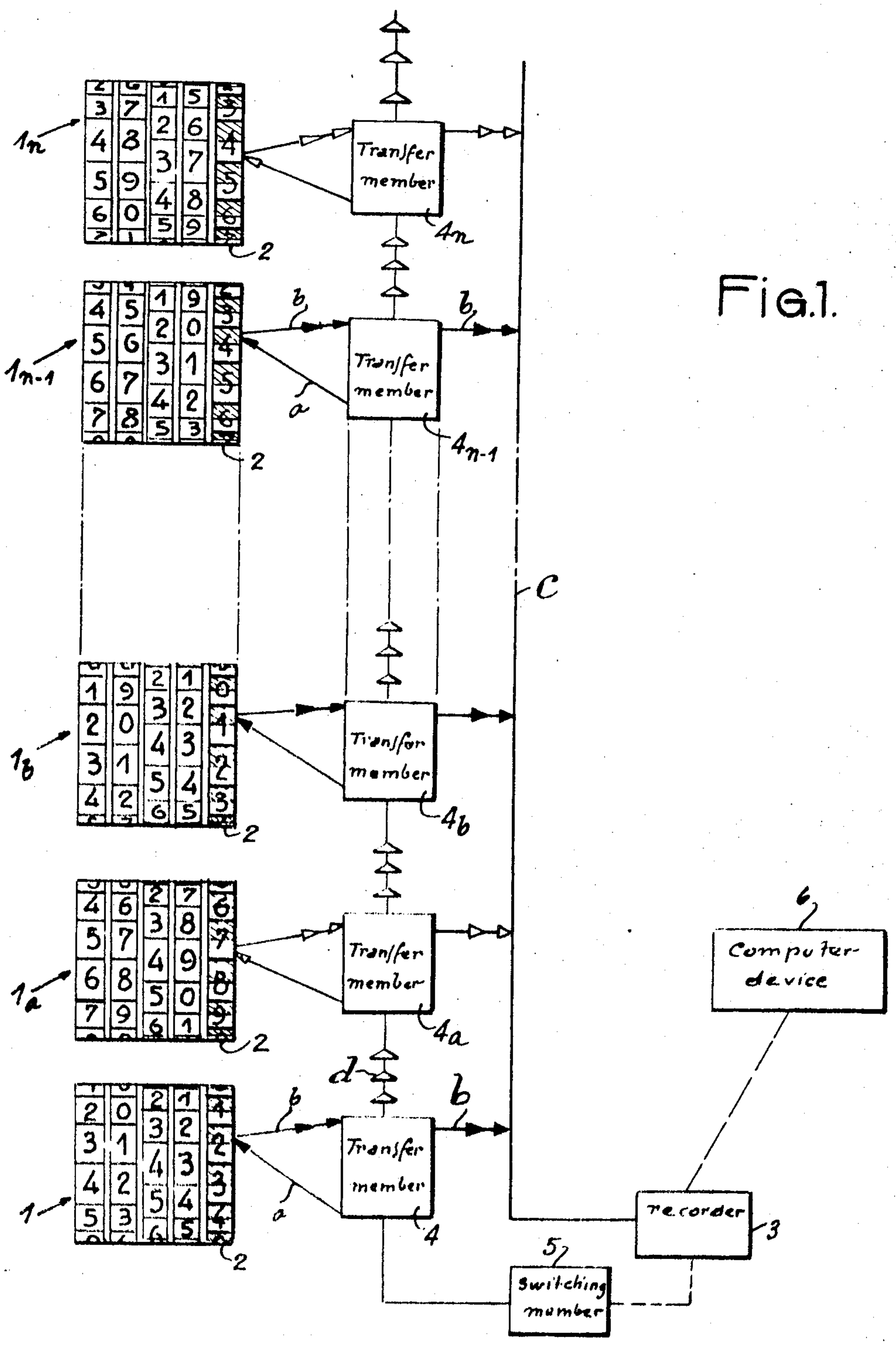
FIG. 1 is a synoptic diagram showing the process of the invention.

In FIG. 1, the pickups are designated by the reference numerals 1 to 1*n*.

In order to show that the invention can be put into operation even in the most complex cases of remote reading, the pickups 1 to 1*n* have been figured under the form of multiple drum integrators thus displaying several multiples of a basic unit, for instance, kilowatt-hours, tens of kilowatt-hours, hundreds, etc.

According to the process of the invention, only the drum of a single row is used. According to the accuracy of the remote measurement that must be made, one or another of the drums is thus chosen, but each time, only one. In the example shown, only drums 2 are considered, which, for instance, shows kilowatt-hours, this unit being alone considered in the description which follows, for it is often electric meters which reveal the greatest difficulties for a given remote reading, seeing that in most cases, variable tariffs are applied according to the hours of the day or according to other parameters. The invention applies in the same manner when the reading of pickups of various kinds must be made. For instance, the pickup 1 can be the integrator of an electric meter, the pickup 1*a*, that of a gas meter, and the pickup 1*b*, that of a water meter, the same series of different pickups then repeating themselves in the same order or according to a different, but obviously known, order.

A first characteristic of the process of the invention consists, for each unit to be detected, of symbolizing the two halves of this unit by two distinct data, in this case and in the example considered, there is comprised, at each unit, in each drum 2, two areas, the one called white, the other black. One thus obtains a succession of white and black areas each representing a half-unit, being, for instance, a half-kilowatt. This is schematized in the drawing which, for each unit, shows a white area and a black area and arrows of corresponding color.

A second characteristic of the process consists then of scanning each drum 2 of each pickup 1 to 1*n* at regular time intervals separated from each other by times less than the shortest duration of time necessary for each drum 2 to turn to an extent corresponding to the length of a white area or a black area, i.e., to half of each unit shown. In this way, one can make sure if two successive examinations, for instance, of the drum 2 of the pickup 1*a*, display each time, a white area, that this drum has either not revolved, or has turned to an extent of less than a half-unit. If, on the contrary, two successive examinations of the same drum show a white area and a black area, then one has the certainty that said drum has revolved to an extent of a half-unit or less, and consequently, one is assured, by the successive examinations made, that at least one information will be given by each of the white and black areas of each unit figured by the drum 2 of each pickup.

A third characteristic of the process of the invention consists of examining each pickup 1, 1*a* . . . 1*n* always in the same order, and to record the white or black state of each pickup in a recorder 3, which enables the eliminating of any necessity to provide the pickups with members displaying their address.

An additional characteristic of the process of the invention also consists of superimposing at each recording of the white and black states of each pickup, at least one basic time signal to then enable the marking of the exact hours of successive records in order to take into account, if so required, variables such as tariff variations as a function of said recording hours or other parameters. The data showing the white and black states of successive pickups are finally analyzed at any kind of time intervals, regular or otherwise, for instance, in a computer for carrying out the integration of passages from one to the other area of each of said pickups.

For practically putting the process of the invention into operation, there is associated, as shown in FIG. 1, to each pickup, a transfer member 4, 4*a*, 4*b* . . . 4*n*.

A switching member 5 is also provided for at least the first transfer member so as to control the beginning of each scanning cycle as well as the repeating of these cycles. In this way, when the switching member 5 provides a signal, then the transfer member 4 is put into motion and it examines the state of the drum 2 of the pickup 1 via channel *a*. The white or black state of the drum 2 being appraised, this state is transmitted, via channel *b* to a receiving collecting channel *c* leading to the recorder 3. After this examination, the transfer member 4 issues an information on a linking channel *d* which has the effect of making member 4 inactive and activating the transfer member 4*a* which proceeds in the same manner.

As can be seen from the foregoing, the number of signals to be transmitted by the switching member 5 for each scanning cycle, can be reduced to 1, this signal then being repeated for each of the successive transfer members 4, 4*a* . . . 4*n* acting at different times when the switch is activated. This corresponds to an asynchronous working. On the contrary, the switching member 5 can also produce successive signals by making the other transfer members 4, 4*a* . . . 4*n* active, one after another. In this latter case, one obviously has a synchronous working.

It is also advisable to note that the signals received from any pickup whatever kind they may be, are always binary, namely, white or black, and consequently, the recording made of them in the recorder 3 is of very simple analysis by means of a computer device 6 to which said recording is brought at any kind of time intervals, which can be several months, if it refers to a reading and making out invoices.

In addition to the foregoing, it is advisable to consider that for putting the process of the invention into operation, only very simple means are used. Actually, numerous means of the technique may make concrete the white and black states of each unit It can be used, for instance, by simple contact tracers kept open during the time shown by a black area, then kept closed during the time shown by a white area. The drums 2 can also be provided with tracks or other magnetic elements corresponding to white and black areas, these tracks, when they pass in front of a reading head, showing a 0 state or a 1 state respectively corresponding to the white and black areas of the drawings.

Reversing switches or switches of any known type can be also be used for displaying, if so desired, states −1 and +1 corresponding respectively to white and black areas, and a state 0 in the case of faulty working.

Owing to the simplicity of the data transmitted through the pickups 1, 1*a* . . . 1*n*, it is always possible to make them comprise a member transmitting these data, and to place this member in the pickup itself without increasing the space required. The data are then transmitted by means of transfer members 4, 4*a* . . . 4*n* which can easily be constituted under the form of independent devices placed, if so required, outside the pickups to which they are then connected only by one or two wires or other linking members.

This possibility is particularly important in the case where the pickups are placed in deflagrating chambers in which it is always very difficult to introduce electric devices as in the case of town gas meters, for instance. Moreover, the transfer members can be placed in sealtight chambers contingently filled with an inert gas.

For clearly understanding that the invention can be put into operation in numerous different ways, several characteristic embodiments are described hereafter.

According to FIG. 2, which shows a purely electrical embodiment, the recorder 3 is mounted at any point of a two-conductor line 7, 8 fed by an alternating current source 9. A third conductor 10 is provided for being fed from one or other of the terminals of a direct current source 11 which has a middle point 11*a* to which the conductor 8 is connected. A reverser contact 12, controlled by the clock 5 forming a pilot device, alternately closes the conductor 10 on one or other of the terminals of the direct source 11. The periodicity of the clock 5 is, for instance about 1 second.

The transfer members 4, 4*a* . . . 4*n* each comprise a relay coil $R_1$, $R_2$, $R_3$ . . . $R_{n-1}$, $R_n$ connected between the conductor 10 and a conductor 13. Diodes $D_1$, $D'_1$, $D_2$, $D'_2$ are mounted on the conductor 13 for each coil $R_1$, $R_2$ . . . $R_n$ and the diodes of the successive transfer members such as 4 and 4*a* have their respective mounting opposed. Also, capacitors $\lambda_1$, $\lambda_2$ are shunted on the coils $R_1$, $R_2$ . . . $R_n$ and said coils $R_1$ to $R_n$ respectively control each two contacts $r_a$, $r'_a$, $r_b$, $r'_b$ . . . $r'_n$. The contacts $r'_a$, $r'_b$ . . . $r'_n$ are inserted between the conductor 8 and reversing switch contacts respectively $c_1$, $c_2$ . . . $c_n$. Each of said contacts, in the two positions that it can occupy, is the concrete image of the white and black areas described in the foregoing, and the contacts $c_1$ to $c_n$ form thus part of the pickups 1 to 1*n*.

Diodes 14 and 15 opposed to each other, are mounted on two conductors in parallel respectively leading to two contacts of said reverser contactors $c_1$ to $c_n$, as well as to the conductor 7.

In addition to the foregoing, we see that the conductor 13 is connected to the conductor 8 by a switch H.

The device works in the following manner:

At the beginning of a scanning cycle of the pickups, the clock 5 closes the contact H during a short time. At the moment when the polarity of the direct source 11 is such that the direction of the current corresponds to the direction of the diode $D_1$, the relay $r_1$ is energized and it closes the contacts $r_a$ and $r'_a$; the relay $r_1$ is thus then self-energized by its contact $r_a$, The contact $r'_a$ being also closed, a current pulse is sent through the contact $c_1$ and the diode 14 on to the recorder. As the diode 14 obviously only allows an alternation of the alternating current to pass, then the pulse received on the recorder is necessarily positive or negative, and hence, it is figurative of the white or black state of the pickup.

FIG. 3*a* shows that the pulse, in the example chosen, is positive for the pickup 1.

At the same time that the operations described above take place, the capacitor $\lambda_1$ is obviously charged.

The contact 12 being controlled by the clock 5, said clock thus monitors the examining or scanning of the successive pickups. Actually, in the position shown, which corresponds to the working just described, the first closing pulse gives the first pulse shown at 4' in FIG. 3, because this is the one which corresponds to the working of the transfer member 4.

When the contact 12 is rocked, the polarity of the current traversing the conductor 10 is obviously reversed so that the diode $D'_1$ stops the passage of the current towards the contact $r_a$ of self-energization; nevertheless, this contact remains closed during the discharging time of the capacitor $\lambda_1$ and the coil of the relay $R_2$ is fed during this discharging time because the current can pass through the diode $D_2$ and said contact $r_a$. The energizing of the coil $R_2$ causes the closing of the contacts $r_b$ and $r'_b$, hence the self-energizing of the coil $R_2$ and the scanning of the pickup 1*a* by its contact $c_2$.

As soon as the capacitor $\lambda_1$ is discharged, the coil $R_1$ being no longer fed, the contact $r_a$ is raised, and consequently, the transfer member 4 is insulated, only the transfer member 4*a* being then in activity for ensuring the examination of the pickup 1*a* which gives a pulse as shown at 1'*a* in FIG. 3*a*, which is supplied during the time that the putting into action of the transfer member 4*a* lasts.

When the contact 12 is again rocked, then the same operations occur and it is the transfer member 4*b* which is made active for ensuring the scanning of the pickup 1*b* by its contact $c_3$.

One sees by the curve of FIG. 3*a* that the pulses recorded by the recorder 3 are all positive for the pickups 1, 1*a*, 1*b* because their contacts $c_1$, $c_2$, $c_3$ are in the same position.

If one now considers the position of the pickup $1_{n-1}$, one sees that its contact is on the terminal passing through the diode 15. In this case, only the negative alternations can pass and the signal recorded is then negative, as shown at $1'_{n-1}$ in FIG. 3*a*.

The device described enables, at each scanning, the proper working to be checked. Actually, presuming for the pickup 1*n* that something has happened in the circuit, such as a broken wire or faulty closing of the contact, then obviously no current is conveyed to the conductor 7, or else the amplitude or form of the pulses provided is different from that of the signals normally produced, which is shown at $1'_n$ in FIG. 3*a*. Seeing that the signals provided are easily identifiable from the control pulses of the clock, then the localizing of the defective pickup or transfer member is obviously easy.

When all the pickups have been scanned, the working of the mechanism is automatically stopped and a new starting pulse must be given from the contact H for switching and the new scanning cycle in again, which, obviously, is done in the same order.

The clock 5 can, if so desired, be eliminated by incorporating a reference track in the recorder 3 showing the pulses of FIG. 3, and in this case, it is these pulses read on the recorder which control the beats of the contact 12, and then, the positive or negative pulses giving the white or black state of the successive pickups 1, 1*a* . . . 1*n* are inscribed by the recorder facing the control pulses.

When, on the contrary, the clock is provided and there are no reference tracks in the recorder, the identifying of the successive pickups is obtained just as simply. Actually, the pulses supplied by the contact 12 are alternating pulses if a middle point is provided in the direct source 11, and in this case, these pulses are added to or withdrawn from the pulses of FIG. 3*a*, hence to the pulses coming from the pickups, which are the mean value of those of the alternations of the alternating current which are applied and one then obtains the curve in heavy line of FIG. 3*b* which is characteristic both of the white and black state of the pickups and the position of these pickups in the chain of pickups scanned. In this case, it is advantageous to open the conductor 8 between the source 11 and the contact H. Likewise, as is usual for electricians, when on the contrary, one wishes to prevent a superimposition of the alternating and direct voltage, a capacitor can be placed parallel to the source 11.

In the case described above, a broken wire or faulty closing of a contact is immediately ascertained by the amplitude or abnormal shape of the pulse, which can be determined by the computer 6.

The role of the computer 6 is obviously to analyze the pulses coming from each pickup, at each scanning cycle of these pickups, and consequently, to ascertain if the successive pickups have passed from a white area (first state) to a black area (second state) or if they have remained on the area that they occupied during the preceding scanning. The computer then adds up the successive passages of areas of each pickup, enabling the totalizing in the same way that this totalizing is eventually carried out at the level of the pickups and which appears, for instance, on the drums 2, if said pickups are provided with such drums.

When, for the device, one has available a direct source of current and an alternating source of current, as in the example described above, it is possible to change certain components. Particularly, the diodes 14 and 15 can be replaced, as shown in FIG. 4, by two capacitors $14_1$, $14_2$ which themselves, can be replaced by inductances. It is also possible equally well to use an alternating or a direct source. In this case, one proceeds, for instance, as in FIG. 5 which shows that the diodes 14, 15 can be replaced by resistances $14_2$, $15_2$ of different magnitudes.

As already explained in the foregoing, the double inverting switch contacts $c_1$, $c_2$, etc . . . can also be replaced by single contacts, as shown in FIG. 6, the contact such as $c'_1$ being in series with the diode 14 and the diode 15 being shunted.

The diode 14 is only shown for presenting a symmetrical circuit, but in fact, it can be eliminated because the two alternations of the alternating current pass when the contact $c'_1$ is closed.

When the contact $c'_1$ is open, for instance, for a white area of the pickup 1, then the signal is made by those of the alternations of the alternating current passing through the diode 15, for instance, positive alternations, and when the contact $c'_1$ is closed, it is the alternations of the other polarity which pass. It is quite obvious that the diodes 14 and 15 can also be replaced by capacitors, resistances or inductances, exactly in the same manner as previously described, when a double reverser contact was used level with the pickups.

FIG. 7 shows an alternative of the device of FIG. 2, according to which use is made of electro-mechanical means. In this embodiment, a single current source, designated by $11_1$, is necessary, this source being able to be either an alternating or direct source, only certain of the components being, if so required, adapted to the kind of current used.

The pickups 1, 1*a*, 1*b* . . . 1*n* are always made in the same manner, and only the transfer members 4, 4*a*, 4*b* are made differently. According to this alternative, each transfer member respectively comprises a motor $M_1$, $M_2$, $M_3$ . . . intended to drive two cams 16, 17, 16*a*, 17*a* . . . .

The cams 16, 16*a* are intended to close contacts $r'_a$, $r'_b$, $r'_c$ ensuring the feed of the contacts $c_1$, $c_2$ . . . of the pickups, which contacts are mounted in series with resistances $\rho_1$, $\rho_2$, $\rho_3$, etc . . . between the feed wires $10_1$ and $7_1$, this latter wire being itself in series with the recorder 3. The cams 16 simultaneously ensure the closing of the contacts 18, $18_1$, $18_2$ . . . (called self-feed), of the successive motors $M_1$, $M_2$, $M_3$ . . . . The cams 17 driven at the same time as the cams 16 are transfer cams and are intended to close, during a short space of time, contacts 19, $19_1$, $19_2$.

As shown by the drawing, when a transitory pulse is applied to the contact H from the clock 5, then the motor $M_1$ is fed, so that it begins to revolve. The cam 16 closes, consequently, the contact 18 and the contact $r'_a$. The closing of the contact 18 ensures the self-feed of the motor $M_1$, and the closing of the contact $r'_a$ ensures the examining of the pickup 1 for seeing if the contact $c_1$ is in a white or black area position. By considering that the motor revolves according to the arrows shown on the cams, when a complete revolution has been nearly made, then the contact 19 is closed, which ensures the feed to the motor $M_2$; there is thus a transfer of the member 4 to the member 4*a*. The motor $M_2$ revolving, its self-feed is then effected by the contact $18_1$ and the closing of the contact $r'_b$ enables the pickup 1*a* to be scanned by the contact $c_2$. As soon as the cam 16 no longer has its active part facing the contacts 18 and $r'_a$, then these contacts are open, and consequently the transfer member 4 is cut out.

FIG. 8 shows the kind of curve obtained level with the recorder. At the moment when the motor $M_1$ is started up, the recorder receives a pulse $i_1$ which shows that the contact $c_1$ is open, thus being, for instance on a white area of the pickup 1. At the end of rotation of the motor $M_1$, the motor $M_2$ is switched on, and consequently the recorder receives a pulse $i_2$ which corresponds to the re-covering zone of working of both motors, the amplitude of this pulse $i_2$ showing that the contact $c_2$ of the pickup 1*a* is also open. The motor $M_1$ being stopped, and the motor $M_2$ continuing to revolve, the pulse received comes to the value $i_1$.

When the cam 17*a* then ensures the feed to the motor $M_3$, then the pulse received would again be equal to $i_2$ if the contact $c_3$ of the pickup 1*b* was open, but this pulse becomes equal to $i_3$ when the contact $c_3$ is closed, as shown. The pulse at the moment following the stopping of the motor $M_2$ then drops to the value $i_4$ to reach the value $i_5$ at the end of the rotation of the motor $M_3$ at the moment of the starting of the next motor and by supposing that the contact of the following pickup is also closed. One sees by the curve of FIG. 8, that the identifying of the pickups and also the white or black state that they have, can be easily analyzed. One also sees from the foregoing description that the device advances step by step from one pickup to the other by the successive working of the transfer members without any piloting of these members, and that the identifying of the data received by the recorder is always easy to analyze even if the successive motors $M_1$, $M_2$, $M_3$ have not strictly the same rotation speed. The scanning of each pickup taking place for one revolution of each motor, it is easily possible to obtain rapid scanning cycles, for example, of about one second, for each transfer member.

It is obvious, by the foregoing, and on examining FIG. 8, that one can see, in the event of a wire breaking, that the pulse is missing, which enables an easy identifying of the faulty place. This also applies to the checking of a defective contact which shows an abnormal amplitude along the curve of FIG. 8.

After FIG. 2 has shown the embodiment of a purely electrical device and that FIG. 7 is that of an electro-mechanical device, it appears from FIG. 9 that a heat-operated device is also easy to make. According to this FIG., one uses, as in FIG. 2, an alternating source 9 and a direct source 11. The contacts $c_1$, $c_2$ of successive pickups 1, 1*a* . . . are formed, as already described, by reverser contacts and these contacts are associated with capacitors $14_1$, $14_2$ of FIG. 4, this mounting being taken by way of example to be different from that of FIG. 2 which uses diodes 14, 15 and also different from that of FIG. 7 which uses a resistance.

Each transfer member 4, 4*a* . . . comprises as motive element a heating resistance 20 associated with a bimetallic thermal switch 21. Each thermal switch 21 controls contacts 23, 23*a* and a conductor 22.

To illustrate the working of this embodiment, one considers that the unit is fed by a direct voltage coming from the source 11 and by an alternating voltage at 400 c/s superimposed on said direct voltage. On closing the transitory contact H of the clock 5, the heating resistance 20 of the transfer member 4 begins to heat up the thermal switch 21, causing the closing of the contact 23, for the direct current passes from the wire 8 to the wire 7 through the resistance 20 and a wire 26. The alternating voltage superimposed on the direct voltage is conveyed from the conductor 8, to the contact $c_1$ of the pickup 1 then to the conductor 7 through one or other of the two capacitors $14_1$ or $14_2$ whose value is different. By providing the recorder 3 with two recording tracks A and B, one sees in FIG. 10, which shows the recording made, that the track A, sensitive to the alternating current, then reveals a pulse $a_1$ which is characteristic of the position of the contact $c_1$, hence the white or black state of the pickup. At the same time, the winding B shows a pulse $b_1$ on the second track, which pulse depends on the direct current and which is thus characteristic of that of the transfer members in activity, in this case, the member 4.

The resistance 20 having begun to heat the thermal switch 21, the contact 23 is then closed and the heating resistance 20 is self-fed from the conductor 10 through the contact 25. The working conditions have not been altered on account of this self-feeding, because the alternating and direct currents are conducted from the conductor 10 to the contact $c_1$ on the one hand, and the resistance 20 on the other, by means of the conductor 24, the pulses collected are always $a_1$ and $b_1$.

When the thermal switch has been sufficiently heated, then the second contact 23*a* is closed, and consequently, direct current is conveyed by the wire $8_1$ to the heating resistance 20 of the transfer member 4*a* whose thermal switch 21 begins to be heated. Immediately after the closing of the second contact 23*a*, the conveyor 22 opens the contact 25, and consequently, the feed, both of direct as well as alternating current, of the member 4 is stopped.

By referring to FIG. 10, one sees that at the moment of closing the second contact 23*a*, one then obtains a pulse of an amplitude $a_2$, since the alternating current then passes during a short moment both by the contact $c_1$ of the pickup 1 and by the contact $c_2$ of the pickup 1*a*. With regard to the track B, the superimposition of the two feeds is also noticed by a pulse of greater amplitude $b_2$.

When the thermal switch 21 of the transfer member 4 has been sufficiently cooled, the conveyor 22 reverts to its first position and the contacts 25 and 23, 23*a* return to their initial position. The track A of the recorder then only receives the pulse $a_3$ showing the white or black state of the pickup 1*a* and the track B receives a pulse $b_3$ which shows that the heating member 20 has been properly fed.

If a defective contact exists in the circuit traversed by the alternating current, then there will not be a pulse at the level of the track A as shown at $a_n$, the modulated pulses of the track B allowing the spot of the defect to be accurately known.

FIG. 11 shows an alternate device in which electronic components are essentially used, thyristors, for instance. It is possible, according to this alternative, to use only one direct current source 11 and, as in FIG. 2, the clock 5 forms a monitor for the reverser switches 12*a*. As formerly, to each pickup 1, 1*a* . . . 1*n* there is associated a transfer member 4, 4*a* . . . 4*n*. Each of these transfer members comprises a thyristor $Th_1$, $Th_2$, $Th_3$ . . . $Th_n$ respectively mounted in series with the contacts $c_1$, $c_2$, $c_3$. . . $c_n$ of the pickups 1 to 1*n* which are, for instance, with simple contacts and associated to two resistances $14_2$, $15_2$. The thyristors are alternately mounted top to bottom between the conductors of feed 7 and 10, and as shown in the drawing, the anode of the first thyristors $Th_1$ is connected by a linking conductor 27 to the gate of the following thyristor, being $Th_2$, whose anode is itself connected by a conductor $27_1$ to the gate of the following thyristor, being $Th_3$ and so on. Each conductor 27 also comprises a capacitor λ' mounted in series with a resistance 27*a*.

At the beginning of the scanning cycle of the pickups 1 to 1*n*, and as in FIG. 2, the transitory contact H is first closed by the clock 5 at the same time that the contacts 12*a* are, for instance, in the position shown. The transitory closing of the contact H at the moment when the polarity of the source is such that the positive is applied to the gate of the first thyristor $Th_1$ through a connecting resistance 28, has the effect of injecting a current into the anode of this thyristor which is thus released while making the charging of the capacitor λ' possible. The current, for passing into the $Th_1$, necessarily passes into one or other of the resistances $14_2$ or $15_2$ associated with the contact $c_1$ of the pickup 1, and consequently, the state of this pickup, white or black, appears on the recorder 3 under the form of a pulse I (FIG. 12). The contacts 12*a* being monitored by the clock 5, at the moment when their position is reversed, the current is also reversed in the circuit described above, and at the moment of this reversing, the thyristor $Th_1$ is consequently blocked while enabling the capacitor λ' to discharge, which causes the starting up of the thyristor $Th_2$ belonging to the transfer member following 4*a*, and this second thyristor, which is then properly fed, ensures the scanning of the contact $c_2$ belonging to the pickup 1*a*. At each polarity inversion, one step forward is consequently taken.

The successive pulses collected at the recorder 3, i.e., the pulses I, II, III, etc . . . are alternated and are thus characteristic of the row of pickups in use. One sees that pulse I has a smaller amplitude than pulse II, for the contact $c_1$ is open, whereas the following contact $c_2$ is closed, which corresponds, on the one hand, to the existence of a white area on the pickup 1 and on the other, to a black area on the pickup 1*a*. Any variation beyond certain limit of the successive signal amplitude obviously immediately reveals a fault, as well as its locality or emplacement.

The alternative according to FIG. 13, shows an electronic construction making use this time of logical circuits. As shown by the drawing, with each of the contact $c_1$, are associated $c_2$, $c_3 \ldots c_n$, successive pickups 1, 1*a*, 1*b* . . . 1*n*, a flip-flop 29, 29*a* . . . 29*n* as well as two AND-gates, respectively P, P', $P_1$, $P'_1$ . . . $P_n$, $P'_n$.

The assembly of the above elements is fed from the direct current source 11. As shown by the drawing, one of the inputs of the gates P, P', $P_1$, $P'_1$, etc . . . of each transfer member is connected to the output $Q_2$ of their respective rockers 29, 29*a* . . . 29*n*. Moreover, the second input of the gates P, $P_1$, $P_2$ . . . $P_n$ is connected by a conductor 30 to the contact 12, monitored by the clock 5, whereas the second input of the gates P', $P'_1$ . . . $P'_n$ is connected to a conductor 31 of the source 11, by means respectively of contacts $c_1$, $c_2 \ldots c_n$ of the pickup 1, 1*a* . . . 1*n*. Furthermore, the feed conductor 32 connecting the second pole of the source 11 to the monitoring contact 12 is connected by the transitory contact H to one of the inputs of the first flip-flop 29.

At rest, all the outputs $Q_1$ of the rockers 29, 29*a*, 29*b* . . . 29*n* are in the state 1, and consequently, outputs $Q_2$ are in state 0. The closing of the transitory contact H causes the sending of a pulse to the flip-flop 29 which is positive or negative according to the logic adopted, and consequently, the output $Q_1$ of this flip-flop passes to the state 0, whereas the output $Q_2$ passes to the state 1. It follows that the gate P is open. The first clock pulse caused by closing of the monitoring contact 12 brings the flip-flop 29 to its primitive state and locks the gate P. The potential variation at the output $Q_2$ of the flip-flop 29 which results from the above working has the effect of switching the following flip-flop 29*a* whose output $Q_2$ passes to the state *b* and the output $Q_1$ to the state 0. Consequently, the AND-gate $P_2$ is open.

As can be seen from the foregoing, each pulse of the clock 5 controlling the contact 12 successively switches the flip-flop, as shown by the following table:

| | 4<br>$Q_1Q_2$ | 4*a*<br>$Q_1Q_2$ | 4*b*<br>$Q_1Q_2$ | 4*n*<br>$Q_1Q_2$ |
|---|---|---|---|---|
| Rest | 10 | 10 | 10 | 10 |
| Start | 01 | 10 | 10 | 10 |
| Pulse No 1 | 10 | 01 | 10 | 10 |
| Pulse No 2 | 10 | 10 | 01 | 10 |
| Pulse No 3 | 10 | 10 | 10 | 01 |
| Pulse No 4 | 10 | 10 | 10 | 10 |

The opening of the gates P', $P'_1$ . . . $P'_n$ is obviously also connected to the state of their corresponding flip-flops and consequently the successive switching of the flip-flop 29, 29*a*, 29*b* . . . 29*n* ensure the examining of the open or closed state of the contacts $c_1$, $c_2 \ldots c_n$, hence the verifying of the white or black state of the pickups 1, 1*a*, 1*b* . . . 1*n*.

As shown by the various methods of embodiment hereinbefore described which, moreover, can have numerous alternatives arising from the know-how in the techniques considered in each case, the process of the inverter arises to cyclically verifying on a repetitive manner the white or black state of the measurement unit of the pickups in a lapse of time always less than the minimum time that each pickup can take for traversing the white or black area of each of the measurement units, then to record these successive examinations for subsequently carrying out the sum of the passage number of a white to a black area successively detected at the level of each pickup so as to make an integration shifted in time, various parameters being possibly displayed, for instance, hours, so that the sums thus totalized become usable as a function of said parameters. It is remarkable to notice that in all the described embodiments of the devices embodying the process of the invention, owing to the fact that at the most two transfer members are in circuit at each moment, the powers to put into operation are obviously very small, which enables to use conductors of a slight section for transmitting data, for instance, conductors of the kind used in telephone cables.

Seeing that the process of the invention can be put into operation, either from direct current sources as well as from alternating current sources, it is obviously easy to choose the most suitable power source according to if alternating current sources are available, such as a distributing network, or on the contrary, if only accumulator batteries, batteries or any other generator are available.

We claim:

1. A device for the continuous remote reading of meters and the like comprising a measuring device including a movable measuring member for indicating units of the variable which is measured by the meter, each unit of measurement being represented on said measuring member by two adjacent areas having a combined length corresponding to said unit, and each said area defining a logic state distinct from the logic state defined by the adjacent area, a recorder, a transfer member for each measuring device, each said transfer member including means for scanning the areas on the appertaining measuring member to provide data signals corresponding to the logic state thereof and for their transmission to said recorder, as well as transfer means for establishing operation of said scanning means of the respective transfer member and means including a clock for effecting a cyclic sequential operation of said transfer means such that the interval between scans of the same measuring member in succeeding cycles is less than the time required by the measuring member to move one-half of a unit of measurement in relation to said scanning means.

2. A device as claimed in claim 1 and further comprising a power source, each transfer member including a linking element connecting said recorder to said power source for transmission of the data signals and including a switching member connected to each linking element, each switching member being activated when the data signals from said scanning means indicates a change from one logic state to the other.

3. A device as claimed in claim 1 wherein each transfer means includes a relay, said relays being interconnected in a series for sequential operation, the first relay of said series being actuated through contact means momentarily actuated by said clock at the beginning of each scanning cycle to operate the scanning means correlated therewith to provide a data signal, and each transfer means also includes means for activating the succeeding relay in the series and for thereafter deactivating its own relay.

4. A device as claimed in claim 3 wherein each of said relays is of the coil type having a main energizing circuit therefore including a first diode and a holding contact connected in series with the coil and which is connectable to a source of direct current through a periodically operating polarity reversing switch actuated by said clock, each said relay coil including a capacitor connected in parallel therewith and which is charged when the coil is energized, and wherein each said relay coil includes an auxiliary energizing circuit therefor, said auxiliary energizing circuit for the coil of the first relay in the series being connectable to said direct current source through contact means momentarily actuated by said clock at the beginning of each scanning cycle, and said auxiliary energizing circuits for the following relay coils each including a second diode connected in series with the first diode and capacitor of the preceeding relay whereby the charge on said capacitor is applied to the relay coil on each relay when the coil of a preceeding relay is deenergized by actuation of said polarity reversing switch.

5. A device as claimed in claim 3 wherein each relay is constituted by a motor, a holding contact controlled by said motor, and cam means driven by said motor for closing said holding contact for activating said scanning means and for activating the succeeding relay.

6. A device as claimed in claim 3 wherein each relay is constituted by a heating element, a holding contact controlled by said heating element, a contact for activating said scanning means, a contact controlled by said heating element for activating the succeeding relay and a switch contact controlled by said heating element for disconnecting the preceeding relay after the data signal has been transmitted.

7. A device as claimed in claim 3 and further comprising a source of direct current, means connected to said clock for reversing polarity of said source and wherein each relay includes a semiconductor and a capacitor connected thereto, said semiconductors being connectable to said source and the semiconductors in adjacent relays being connected in back-to-front relation, whereby when the current is reversed by said reversing means one relay is deactivated and the following relay is activated by the charge on the capacitor of the deactivated relay.

8. A device as claimed in claim 7 wherein the semiconductors are thyristors and further comprising a plurality of linking elements connecting the anode of each thyristor to the gate of a succeeding thyristor, each capacitor being mounted in series with each linking element to ensure activation of the succeeding thyristor when the current is reversed by said reversing means.

9. A device as claimed in claim 3 wherein each relay is constituted by a bi-stable flip-flop and each transfer member further comprises two gates, one being mounted in the circuit of the scanning means correlated therewith and the other being connected to the flip-flop of the succeeding relay, each said flip-flop controlling the opening and closing of the gates of the corresponding transfer member to activate the succeeding relay after the data signal has been transmitted.

* * * * *

PO-1050
(5/69)

UNITED STATES PATENT OFFICE
CERTIFICATE OF CORRECTION

Patent No. 3,662,366 Dated May 9, 1972

Inventor(s) CLAUDE MARIE DANIEL NEUVILLE

It is certified that error appears in the above-identified patent and that said Letters Patent are hereby corrected as shown below:

Claim 1, line 2, after the word "device" the following has been omitted:

--- for each meter, each said measuring device --

Signed and sealed this 19th day of September 1972.

(SEAL)
Attest:

EDWARD M.FLETCHER,JR.
Attesting Officer

ROBERT GOTTSCHALK
Commissioner of Patents